Feb. 27, 1940.    C. G. HAESLOOP    2,191,651
CART WHEEL BATTERY
Filed Sept. 16, 1936    2 Sheets-Sheet 1
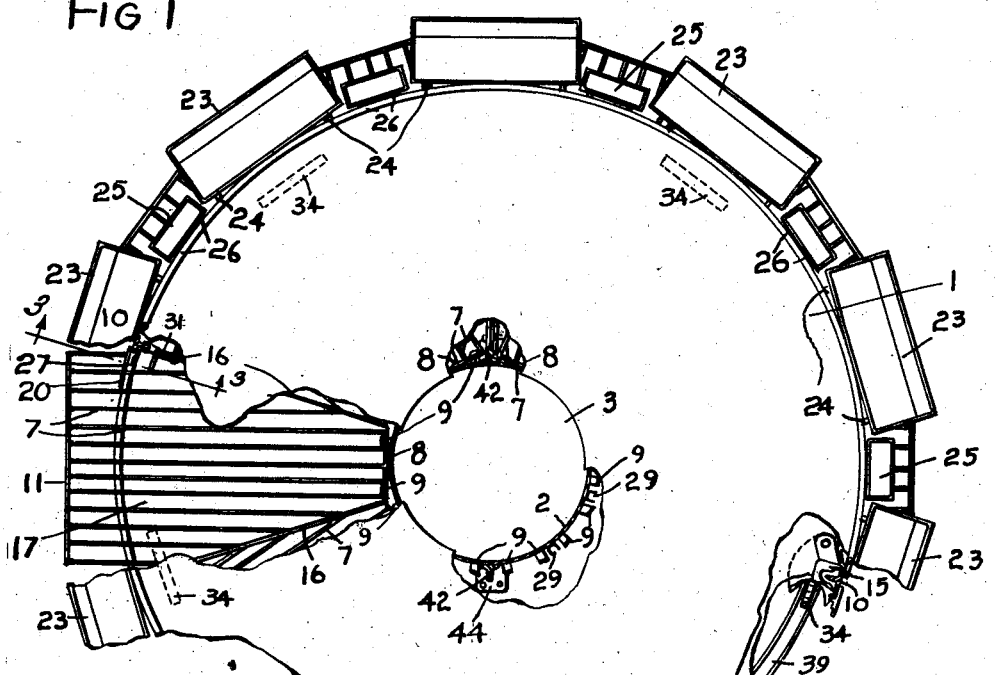
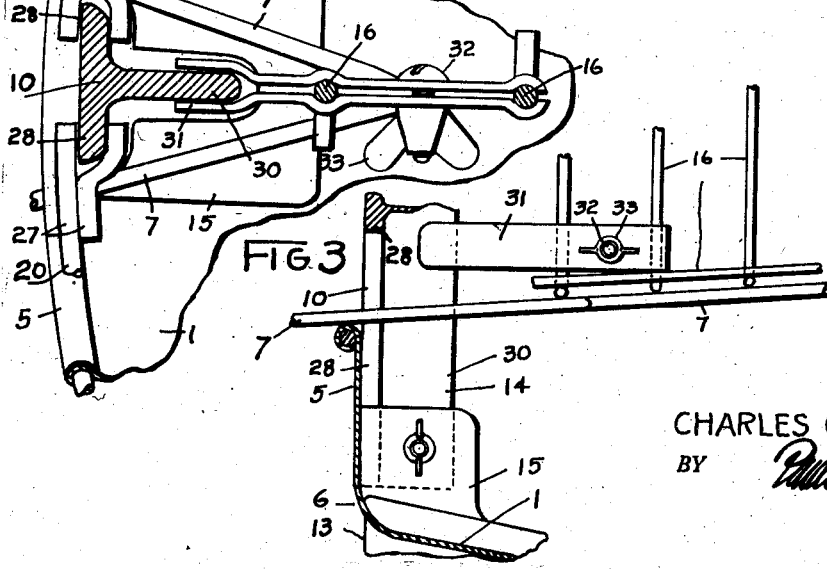
INVENTOR.
CHARLES G. HAESLOOP.
BY
PAUL A. TALBOT.
ATTORNEYS.

Feb. 27, 1940.  C. G. HAESLOOP  2,191,651
CART WHEEL BATTERY
Filed Sept. 16, 1936   2 Sheets-Sheet 2
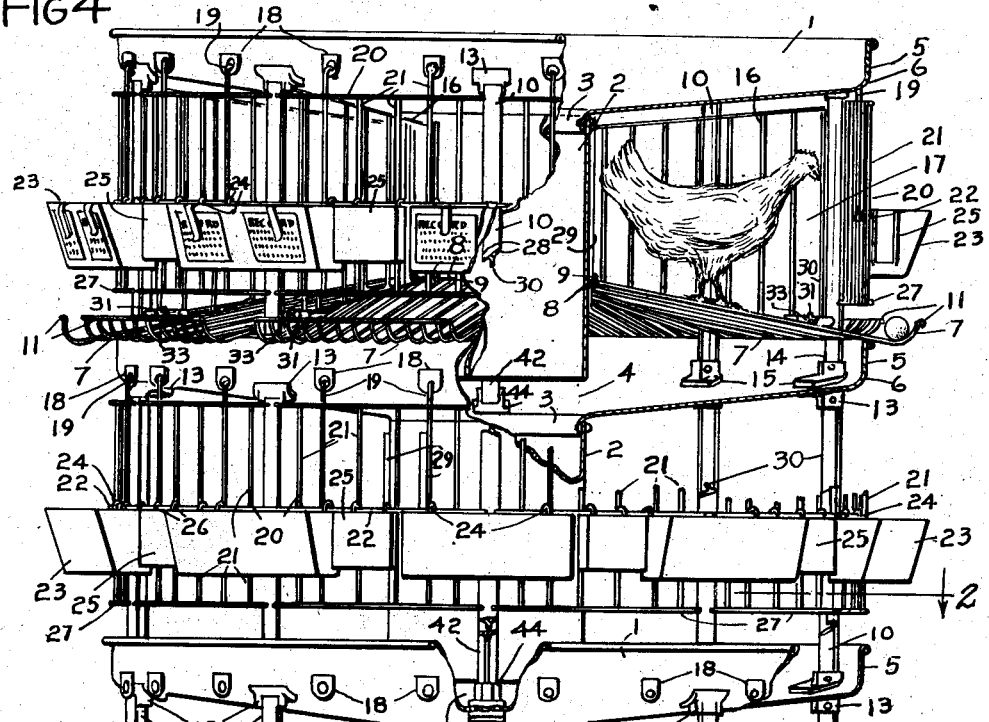
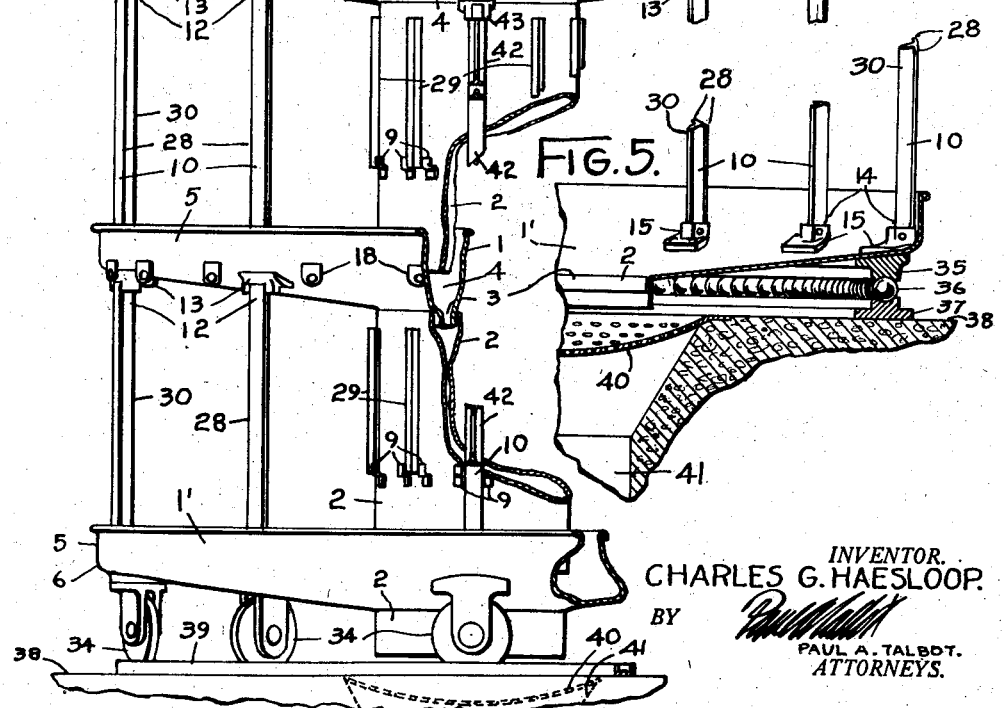
INVENTOR.
CHARLES G. HAESLOOP.
BY
PAUL A. TALBOT.
ATTORNEYS.

Patented Feb. 27, 1940

2,191,651

UNITED STATES PATENT OFFICE 2,191,651

CART WHEEL BATTERY

Charles G. Haesloop, Rocky Point, N. Y.

Application September 16, 1936, Serial No. 101,060

9 Claims. (Cl. 119—48)

My invention relates to batteries for use in the poultry business in which, particularly, laying hens are caged and fed to produce more eggs and to increase health and sanitation, and has among its objects to provide:

A battery which decreases the labor of feeding and attending the laying hens while living in the battery.

A sanitary and compact poultry battery. A poultry battery which may be shipped to the user and easily assembled by him without requiring mechanical skill and tools.

A poultry battery having radially arranged laying cages.

A poultry battery which revolves permitting feed, water and cleaning to be accomplished by the operator without having to move from cage to cage.

A poultry battery which may be cleaned by washing or flushing.

A poultry battery having a common drain to the sewer from all cages arranged in it.

A poultry battery comprising quickly assembled sections in tiers one above the other.

A poultry battery which may be quickly disassembled and moved for fumigating and replacement.

I accomplish these and other objects by the construction herein described and shown in the accompanying drawings forming a part hereof in which:

Figure 1 is a plan view of my device.

Figure 2 is a detail of the floor grating and partition at one of the outer stanchions, taken on the line 2 in Fig. 4.

Figure 3 is a fragmentary detail showing the partition, floor grating and stanchion socket, taken on the line 3—3 of Fig. 1.

Figure 4 is an elevation of my device.

Figure 5 is a fragmentary section of a modification showing a ball-bearing support for my device.

Similar reference characters refer to similar parts throughout the several views of the accompanying drawings and in the specification to follow.

The science of raising poultry to produce the maximum yield of eggs and the consequent profits gained by feeding and maintaining sanitary and comfortable surroundings for the hens while laying, have resulted in the development and perfection of my invention. The spread of poultry diseases, the production of eggs of quality, size and flavor, and the reduction of labor in caring for the laying hen in particular, have been regulated by caging hens in batteries where a record of their performance has eliminated the uncertainty of the results.

In the following specification, I have described and in the drawings I have shown in detail one of the numerous constructions of my invention which may be modified in many respects to suit the conditions of operation. A large poultry establishment for instance may require batteries of a different construction as to size and number of units as well as the number of batteries employed, as well as the type and arrangement of the cages.

In this specification, therefore, I will not attempt to point out all of the modifications possible and in confining my disclosure to a single detailed description, I am doing so that my invention may be better understood.

My preferred construction comprises a battery of units arranged in tiers, each unit comprising a number of cages radially disposed around a common center like a cart-wheel. The units may be shipped assembled or may be "knocked down" and assembled at the point of delivery or the units may be shipped all assembled to be placed in tiers ready for use. A single unit may be used as a battery without being assembled in tiers.

Each unit comprises at its top the drain pan 1 which inclines toward the center opening 2 and the center pipe 3, secured to the drain pan around the center opening and projecting downwardly to a point sufficiently above the next unit below to provide the space 4 for the free discharge of the flushing water and the droppings and other refuse washed along with the water.

The drain pans are preferably flanged at 5 upwardly around their outer periphery 6 to afford an outer rest for the floor gratings 7 which are inclined outwardly and in the opposite direction to the incline of the drain pans.

The inner end bar 8 of each floor grating engages the hooks 9 secured to the center pipe 2, thus holding it firmly in place. The width of the floor grating 7 is tapered between its inner end and the outer stanchions 10 which permit the free withdrawal of said floor grating after unhooking the inner end yet preventing lateral movement of the floor grating which is extended outward beyond said stanchions and turned upwardly at its outward end 11 to provide a stop and depository for the eggs which roll down the inclined grating.

The outer stanchions are detachably secured to the drain pan at their upper ends 12 by means of the sockets 13 which are secured to the under surfaces of the drain pans 1. The lower ends 14 of the stanchions 10 are detachably secured to the upper or inner surfaces of the drain pans by means of the sockets 15 secured thereto.

The sockets 13 and 15 are positioned directly above each other one on each side of the surfaces of the material of which the drain pans are constructed so that the stanchions when assembled are superimposed one above the other, thereby causing the weight of the units to be carried by the stanchions and not by the drain pans. This arrangement of the outer stanchions has the effect of providing a single annular row of stanchions from the top to bottom of my device when the units are assembled in tiers, the number of the stanchions represents also the number of partitions 16 between the cages 17 between the partitions in each unit. I have shown ten cages and four tiers of units in all 40 cages in the battery. Of course the number of cages as well as the number of tiers may vary to suit the conditions.

Along the under surface of the outer periphery of the drain pan, I have provided above each cage apertured ears 18 to receive the hooks 19 of the front doors 20, each of which is quickly removable by disengaging said hooks which are preferably constructed by turning over the ends of two of the vertical bars 21 forming the doors. A center lateral bar 22 ties the vertical bars 21 together and affords a means of hooking on the feed boxes 23 by means of the hooks 24, as well as the water fount 25, also provided with the hooks 26 likewise engaging the lateral bar.

The lower edge of the door 20 is provided with the bottom bar 27 which is preferably bifurcated at each end to engage the flanges 28 of the stanchions, permitting the doors to slide vertically upward disengaging the hooks 19 from the apertured ears 18. The doors may then be removed by raising one bifurcated end of the bottom bar sufficiently above the opposite bifurcated end to disengage the flange 28 of the stanchion 10.

The partitions 16 rest on the floor gratings 7 preferably by bending a part of the vertical bars which form them at 90 degrees, and are held in the channel 29 secured to the pipe 2 at the center and are detachably secured to the flange 30 of the stanchion 10 by the clamps 31 and bolt 32 with its wing nut 33.

The bottom drain pan 1' is substantially like those in the tiers above except that the sockets for the stanchions on its under surface and the apertured ears for the doors are not used. A plurality of wheels or castors 34 are secured preferably at the base of each alternate stanchion. The modification in Figure 5 shows an upper ball race 35 as a substitute for the wheels 34, and the balls 36 run between the ball race 35 and ball race 37 which is secured to the floor 38. When wheels are in use a channel track 39 is used. Of course if flanged wheels are used a rail in the place of the channel track can be substituted. The rail, track or ball race is circular, causing the center pipe to remain positioned over the floor drain 40 connecting my device to the sewer system 41.

I have provided two center stanchions 42, having sockets 43 and 44, secured to the drain pan 1, and superimposed one above the other in much the same manner as the outer stanchions 10.

I do not wish to be limited to the construction shown and herein described in detail as I may wish to depart therefrom within the scope of the appended claims which succinctly set forth my invention.

I claim:

1. In a poultry battery, laying cages arranged radially comprising units each having a drain pan, and stanchions terminating in and detachably secured to said drain pans whereby any number of units may be quickly assembled to form tiers to change the capacity of the battery.

2. In a poultry battery, laying cages arranged radially comprising units each having a drain pan, and stanchions superimposed above each other and resting in said pans to support each of said units.

3. In a poultry battery, units comprising a plurality of radially disposed laying cages, sockets and stanchions engaging said sockets and inclined drain pans secured to said sockets forming the top and bottom of each unit whereby said units may be used singly or in multiple in tiers to form self contained batteries.

4. In a poultry battery, units comprising a plurality of laying cages, inclined drain pans forming the top and bottom of each unit, and stanchions secured to the top and bottom of each drain pan under the top pan and over the bottom pan whereby a battery may comprise one unit or a tier of such units.

5. In a poultry battery, units comprising a plurality of laying cages radially disposed and means forming a part of each unit detachably securing said units in tiers said means comprising outer stanchions, drain pans and sockets secured thereto superimposed one above the other engaging said stanchions whereby several of said units may be stacked in tiers or one of said units may be used as a battery, independent of other units.

6. In a poultry battery, units comprising a plurality of laying cages comprising inclined drain pans forming the top and bottom of each unit, center pipes secured to and draining said drain pans and each pipe except the lowest having supporting means thereon and inclined floor gratings resting on said drain pans near one end and supported by said supporting means near the opposite end.

7. In a poultry battery, laying cages arranged in tiers, each tier including a drain pan under the cages of that tier, each pan having a central opening in vertical alinement with the other openings, means for conducting waste material from the central opening of each pan except the lowest to the opening of the next lower pan, and means for conducting waste material from the central opening of the lowest pan to a sewer inlet below said opening.

8. In a poultry battery, laying cages arranged in tiers, each tier including a drain pan under the cages of that tier, each pan having a central opening in vertical alinement with the other openings, means for conducting waste material from the central opening of each pan except the lowest to the opening of the next lower pan, and means, part of which is attached to the lowest pan, for supporting said battery for rotation about a central vertical axis.

9. In a poultry battery, laying cages arranged radially, a central pipe forming an inner end wall to each of said laying cages, said cages including floor gratings detachably secured to said center pipe, said floor gratings having tapered sides and supported at their opposite ends below the securing means on said pipe.

CHARLES G. HAESLOOP.